United States Patent [19]

Fox et al.

[11] Patent Number: 4,941,075
[45] Date of Patent: Jul. 10, 1990

[54] TIMING CORRECTION FOR SQUARE WAVE INVERTER POWER POLES

[75] Inventors: David A. Fox; Ralph D. Jessee, both of Shawnee Township, Ohio

[73] Assignee: Westinghouse Electric Corp., Pittsburgh, Pa.

[21] Appl. No.: 301,203

[22] Filed: Jan. 24, 1989

[51] Int. Cl.$^5$ ............................................. H02M 1/12
[52] U.S. Cl. ...................................... 363/41; 363/98; 323/283
[58] Field of Search ...................... 363/16, 56, 57, 55, 363/41, 42, 98, 131, 132; 323/241, 283, 322

[56] References Cited

U.S. PATENT DOCUMENTS

| | | | |
|---|---|---|---|
| 3,491,282 | 1/1970 | Heinrich et al. | 363/43 |
| 3,855,520 | 12/1974 | Stich | 323/283 |
| 4,095,165 | 6/1978 | Boros | 323/283 |
| 4,166,247 | 8/1979 | Miyazawa | 363/41 X |
| 4,370,702 | 1/1983 | Shuey et al. | 363/42 |
| 4,443,842 | 4/1984 | Jessee | 363/41 |
| 4,500,837 | 2/1985 | Shuey et al. | 363/97 X |
| 4,502,105 | 2/1985 | Jessee | 363/41 |
| 4,504,899 | 3/1985 | Jessee | 363/56 |
| 4,556,842 | 12/1985 | Rosswurm | 363/97 X |
| 4,617,622 | 10/1986 | Fox | 363/98 |

Primary Examiner—Patrick R. Salce
Assistant Examiner—Kristine Peckman
Attorney, Agent, or Firm—R. P. Lenart

[57] ABSTRACT

This invention controls the operation of solid state swithing devices in an output stage of an electronic inverter by using a counter to maintain a fixed delay between transition points in a switching command signal and a modified switch operation signal. The counter begins counting clock pulses following a transition in the switch command signal and produces a transition point in a switch drive signal when it reaches a predetermined count. The solid state switching device changes conduction states in response to the transition points in the switch drive signal. This produces a transition point in a switch operation signal. Those transition points are time-shifted by an amount corresponding to the level of DC voltage in the inverter output to produce the modified switch operation signal. The counter stops counting in response to one of the transition points in that modified switch operation signal. By starting and stopping the counter in this manner, a fixed delay is maintained between transition points in the command signal and the modified switch operation signal.

6 Claims, 4 Drawing Sheets

_4,941,075_

TIMING CORRECTION FOR SQUARE WAVE INVERTER POWER POLES

BACKGROUND OF THE INVENTION

This invention relates to electronic inverters and, more particularly, to controlling the operation of solid state switching devices in an output stage of such inverters.

Electronic inverters create an AC output voltage by alternately switching output terminals between one of two DC voltage levels. Total harmonic distortion in the output voltage can be minimized by precisely controlling the operation of the output circuit switching devices. Since the operating times of various switching devices depend upon individual device characteristics and changes in the load being supplied by the inverter, a switch drive circuit which adapts to changes in individual switch operating time is desired.

Inverters utilizing pulse width modulation or harmonic neutralization techniques require very accurate timing for control of the total harmonic distortion. Techniques for timing correction have been developed as illustrated in U.S. Pat. Nos. 4,443,842; 4,502,105; and, 4,504,899, for three-phase DC link inverters. Those circuits utilize a multiplexed correction control circuit compatible with a read only memory based switching pattern timing circuit. Such circuits are more complex than necessary for staggered phase or square wave, single phase inverters. It is therefore desirable to devise a timing correction circuit which is compatible with staggered phase or square wave, single phase inverters.

SUMMARY OF THE INVENTION

This invention controls the operation of solid state switching devices in an output stage of an electronic inverter by using a counter to measure the delay between a transition point in a switching command signal and a transition point in a feedback signal which is responsive to the operation of a solid state switching device in the output stage of the inverter. In accordance with the invention, a counter is used to count clock pulses following a transition point in a switching command signal. Transition points in a switch drive signal are produced when the counter reaches a predetermined count. The solid state switching device changes conduction state in response to the transition points in the switch drive signal. This results in a switch operation signal having transition points that occur in response to a change in the conduction state of the solid state switching device. The transition points in the switch. operation signal are timed-shifted by an amount corresponding to the level of DC voltage in the inverter output to produce a modified switch operation signal. The counter stops counting in response to a transition point in the modified switch operation signal.

By controlling the starting and stopping times of the counter and using a predetermined count in the counter to initiate transition points in the switch drive signal, this invention compensates for changes in switch operating time to maintain a fixed delay time between transition points in the command signal and the actual operation of the switching device. This invention encompasses both the method of controlling the operation of inverter switches described above and circuits which perform that method.

BRIEF DESCRIPTION OF THE DRAWINGS

The invention will become more readily apparent from the following description of the preferred embodiment thereof, shown by way of example only, in the accompanying drawings wherein.

DESCRIPTION OF THE PREFERRED EMBODIMENT

Figure 1:
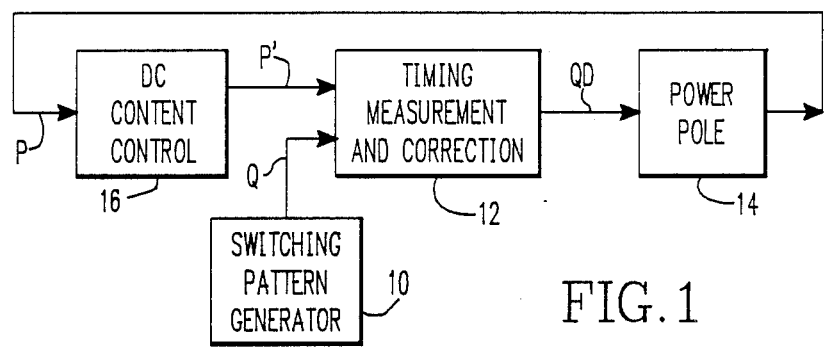
FIG. 1 is a functional block diagram of a timing correction circuit constructed in accordance with the present invention.

Referring to the drawings, FIG. 1 is a functional block diagram which illustrates the operation of the present invention. A switching command signal Q is supplied by a switching pattern generator 10 to a timing measurement and correction circuit 12. That circuit produces a switch drive signal QD, having transition points which are used to control the operation of individual solid state switching devices in an inverter power pole output circuit 14. For a square wave inverter power pole, there is only one positive and one negative transition per cycle in the switch drive signal QD. The timing measurement and correction circuit uses a dedicated counter for each edge, or transition point, in the switch drive signal to simplify the logic circuit and reduce the amount of required memory. The circuit operation discussed below relates to the correction of one positive going switching transition per cycle, and applies to any square wave inverter.

Following a positive transition point in the switch drive signal applied to the power pole, the output of the power pole P goes high after a switching delay dependent upon load current and varying from one device to another. A DC content control 16 adds a small variable delay to the signal P to control the value of a DC component in the inverter output, thereby producing a modified switch operation signal P'.

Figure 2A:
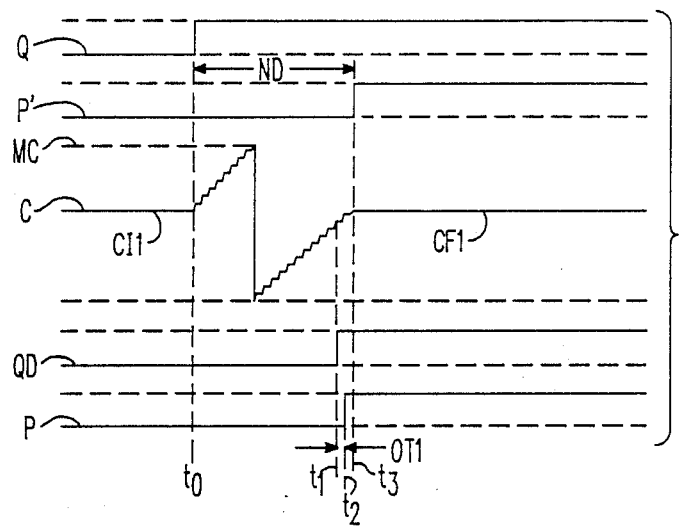
FIGS. 2A, 2B, and 2C are waveform diagrams which illustrate the operation of the block diagram of FIG. 1.

FIG. 2A is a series of waveforms which illustrate the normal steady state operation of a circuit constructed in accordance with this invention. The purpose of the circuit is to maintain a fixed delay between transition points in the switching command signal Q and the modified switch operation signal, or feedback signal, P'. This is called the normal delay ND. When the switching command signal Q goes high at time $t_o$, the counter begins to increment at a clock frequency. The counter output C is shown as an analog function for clarity. As seen in FIG. 2A, the counter goes to its maximum count MC, resets to zero, and continues counting. At one-half of the full count, the most significant bit of the counter goes high, thereby producing a transition point in the drive signal QD at time $t_1$. Following a switch operating time OT1, the power pole switch changes conduction state at time $t_2$. This results in a transition in the power pole output voltage signal P. The DC content control adds an additional delay and produces a transition point in the modified switch operation signal P' at the time $t_3$. This stops the operation of the counter, with the number held in the counter representing the sum of the DC content delay and the power pole switching delay. Under steady state conditions, the final count CF1 is equal to the initial count CI1 after each switch point. Transition points in the modified switch operation signal P' are delayed from those in the demand signal Q by exactly the full count time.

Figure 2B:
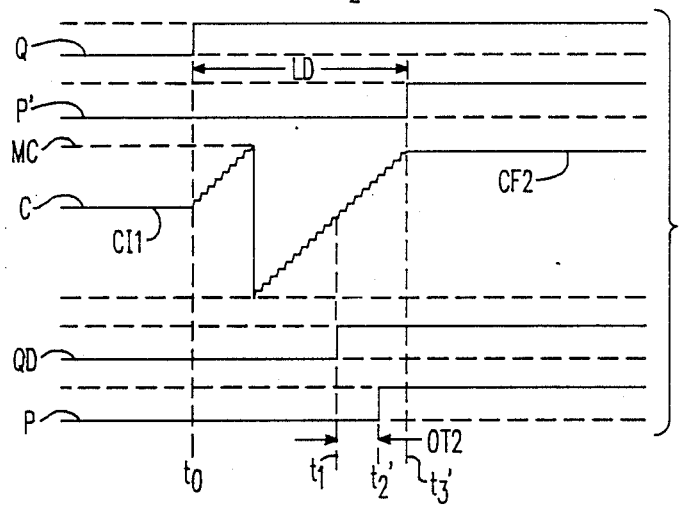
Figure 2C:
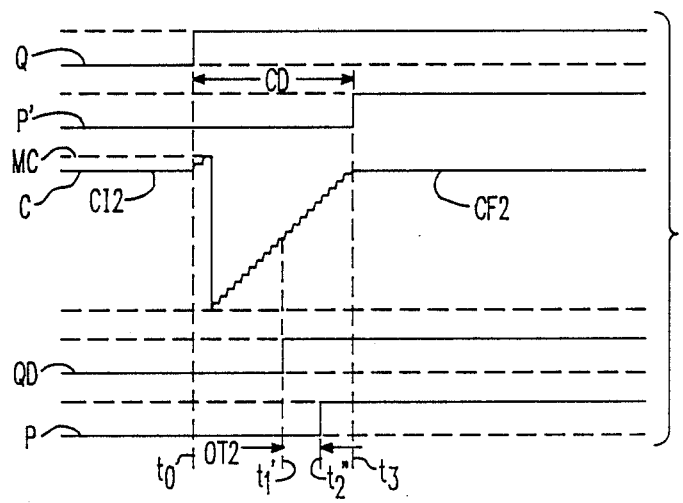

FIG. 2B is a series of waveforms which illustrate the operation of the invention following a sudden increase in the power pole switching time, to a longer value OT2 following a load change. This delays the transition point in the switch operation signal P to time $t_2'$, and subsequently delays the operation of a transition point in the modified switch operation signal P', such that a long delay LD exists between transition points in Q and P'. Since the counter is operational for a longer period of time, the final count CF2 is larger than the final count CF1 in FIG. 2A. Waveforms which illustrate the next cycle are shown in FIG. 2C. Since the counter begins at a higher counter CI2, it produces a transition point in the drive signal QD at an earlier time $t_1'$. The transition point in the modified switch operation signal P' is thus corrected back to the proper point after a corrected delay CD. The circuit has now reached a new steady state level corresponding to the longer power pole switching time OT2.

Figure 3:
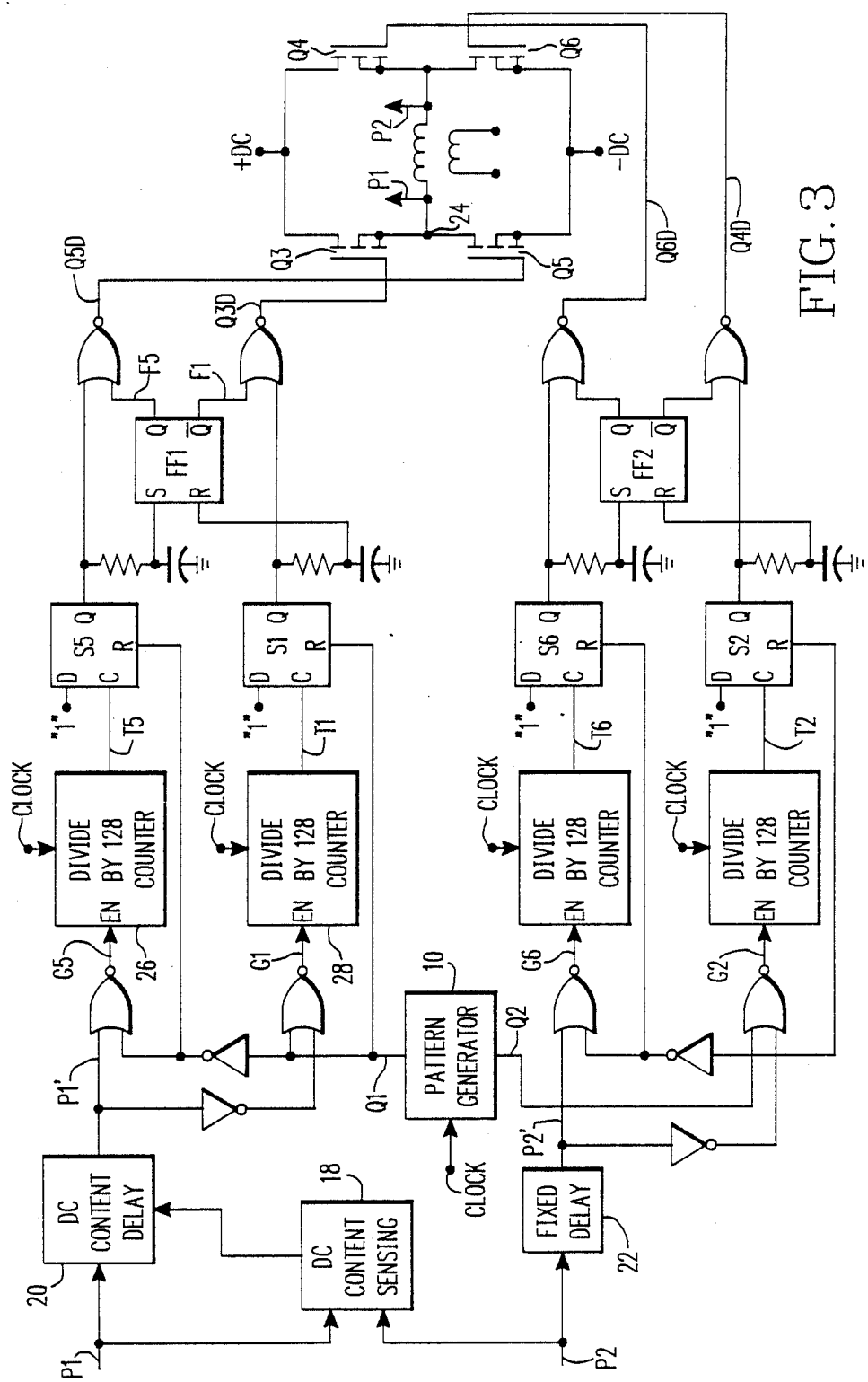
FIG. 3 is a schematic diagram of an inverter power pole switching circuit constructed in accordance with one embodiment of the present invention.
Figure 4:
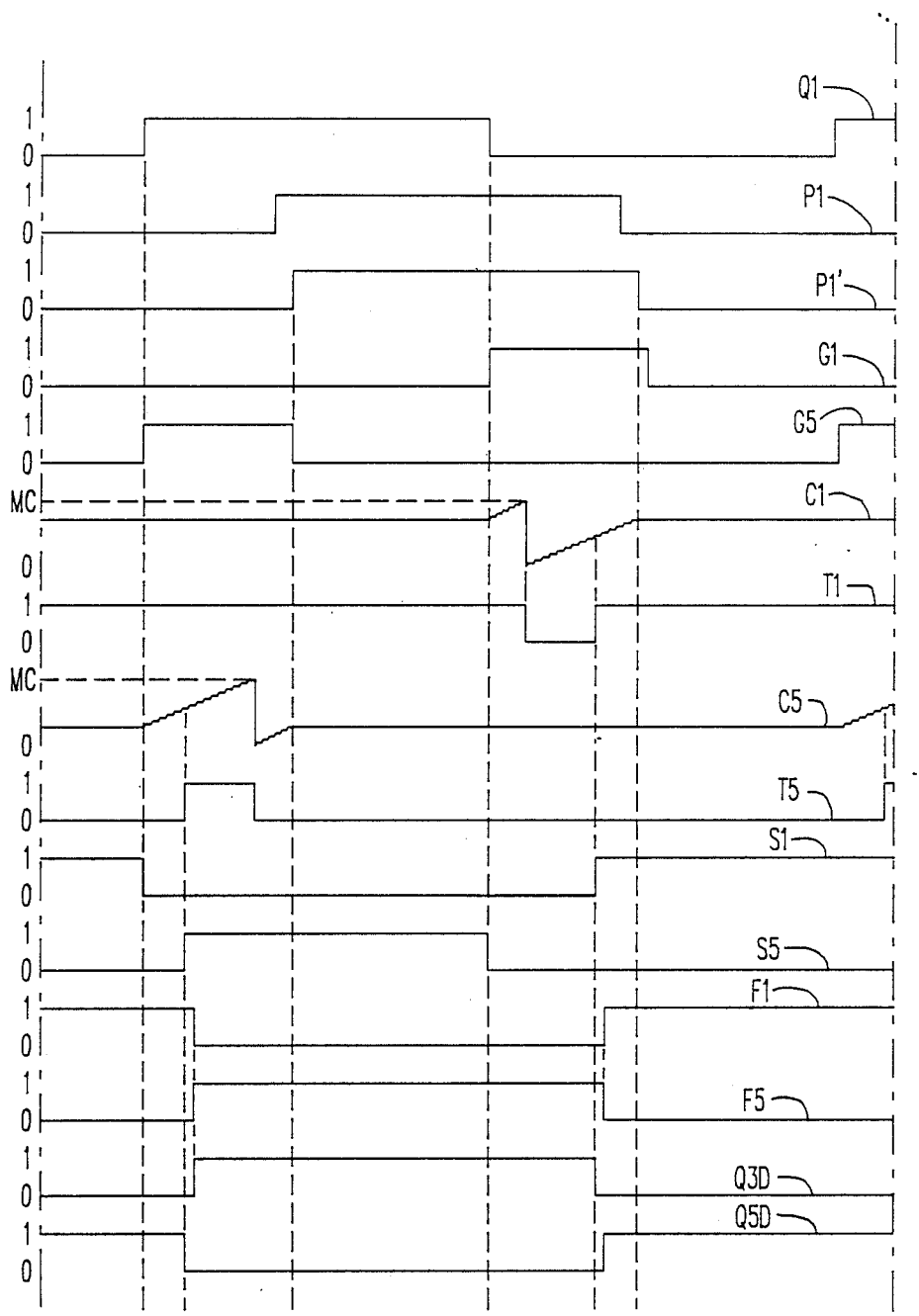
FIG. 4 is a series of waveforms which illustrate the operation of the circuit of FIG. 3.

FIG. 3 is a simplified schematic diagram showing correction circuits required for an inverter output circuit having four transistors Q3, Q4, Q5, and Q6. Transistors in the two power poles (Q3, Q5, and Q4, Q6) may be operated in phase to produce a square wave output or staggered to produce a harmonic neutralized quasisquare wave output. One control circuit in accordance with FIG. 1 is required for each transition of the square wave (two circuits per power pole). DC content control is provided by a DC content sensing circuit 18 constructed in accordance with known techniques, that operates to control the power pole switching signal P1 to keep the average voltage difference (P1 minus P2) at zero. This is accomplished by biasing the DC content delay as illustrated in block 20. A matching fixed delay as illustrated in block 22 is provided in the P2 control side. Otherwise, the control circuits for the two power poles are identical. FIG. 4 is a series of wave forms which illustrate the operation of the circuit of FIG. 3 in the control of power pole 24. Gate signals G1 and G5 separate the positive and negative signal transitions in the modified switch operation signal P1'. Counters 26 and 28 operate in the manner described with reference to FIGS. 2A, 2B, and 2C. Flip-flop circuit FF1 provides a controlled underlap to the transistor drive signals Q5D and Q3D to prevent shoot-through currents in the power pole due to simultaneous conduction of Q3 and Q5.

A circuit constructed in accordance with FIG. 3 has been tested. Variable pole switching times were simulated to increase the nominal 2 microsecond DC content delay up to 10 microseconds. The time delay between transition points in the switching demand signal Q1 and the modified switch operation signal P1' remained constant within 100 nanoseconds.

When initially turned on, the timing circuit of FIG. 3 will begin to generate a square wave pattern. Assume that initially the switching demand signal Q1 is high. The Q output of flip-flop S1 is then forced low by the Reset input. The Reset input of FF1 will also go low after an R-C time delay. The Q output of flip-flop S5 and FF1 may be high or low at this time. Consider first that the Q output of S5 is high. After the R-C delay, FF1 output F5 will go high and F1 will go low. The drive signals will then turn on Q3 and turn off Q5, forcing P1 high. After the DC content delay, G5 will go low, stopping the counter with T5 low. The circuit will remain in this state until the timing circuit generates the next transition.

If the Q output of flip-flop S5 is initially low, then the F5 output of FF1 may be high or low. If F5 is high, the drive signals will turn on Q3 and turn off Q5 as described above. If F5 is low, Q5 will turn on and Q3 will turn off. The switch operation signal P1 will go low, turning on G5 and allowing the counter to generate the T5 output. T5 will clock S5 high which results in the action described above.

A similar sequence of events occurs if the switching command signal Q1 starts out low. In all cases the circuit reaches a defined state during the first cycle of operation.

It should now be apparent that the present invention can be used to control inverter power pole switching times by taking into account changes in the actual times required for the switches to change conduction states. This can be used to maintain good total harmonic distortion under changing load conditions. Such circuits are compatible with 20 kHz single phase inverters and existing DC content control technology.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A method of controlling the operation of solid state switching devices in an output stage of an electronic inverter, said method comprising the steps of:
    producing a first switching command signal;
    using a first counter to count a plurality of clock pulses, said counter beginning to count said pulses in response to a transition point in said first switching command signal;
    producing a first switch drive signal having transition points occurring when said first counter reaches a predetermined count;
    changing the conduction state of a first solid state switching device in response to the transition points in said first switch drive signal;
    producing a first switch operation signal having transition points occurring in response to a change in the conduction state of said first solid state switching device;
    producing a modified first switch operation signal by time shifting the transition points of said first switch operation signal by an amount corresponding to the level of DC voltage produced by said inverter; and
    stopping said first counter in response to one of said transition points in said modified first switch operation signal.

2. A method of controlling the operation of solid state switching devices in an output stage of an electronic inverter, as recited in claim 1, wherein:
    said predetermined count is one half of a maximum count of said first counter; and
    said first counter reaches said maximum count, resets to zero and continues counting until being stopped in response to one of said transition points of said modified first switch operation signal.

3. A method of controlling the operation of solid state switching devices in an output stage of an electronic inverter, as recited in claim further comprising the steps of:
  producing a second switching command signal;
  using a second counter to count said pulses, said second counter beginning to count said pulses in response to a transition point in said second switching command signal;
  producing a second switch drive signal having transition points occurring when said second counter reaches said predetermined count;
  changing the conduction state of a second solid state switching device in response to the transition points in said second switch drive signal;
  producing a second switch operation signal having transition points occurring in response to a change in the conduction state of said second solid state switching device;
  producing a modified second switch operation signal by time shifting the transition points of said second switch operation signal by an amount corresponding to said level of DC voltage produced by said inverter; and
  stopping said second counter in response to one of said transition points in said modified second switch operation signal.

4. A method of controlling the operation of solid state switching devices in an output stage of an electronic inverter, as recited in claim 3, wherein:
  said predetermined count is one half of a maximum count of said first counter; and
  said second counter reaches said maximum count, resets to zero and continues counting until being stopped in response to one of said transition points of said modified second switch operation signal.

5. A circuit for controlling the operation of solid state switching devices in an output stage of an electronic inverter, said circuit comprising:
  means for producing a first switching command signal;
  a first counter for counting a plurality of clock pulses, said counter beginning to count said pulses in response to a transition point in said first switching command signal;
  means for producing a first switch drive signal having transition points occurring when said first counter reaches a predetermined count;
  a first solid state switching device, said first solid state switching device changing conduction state in response to the transition points in said first switch drive signal;
  means for producing a first switch operation signal having transition points occurring in response to a change in the conduction state of said first solid state switching device;
  means for producing a modified first switch operation signal by time shifting the transition points of said first switch operation signal by an amount corresponding to the level of DC voltage produced by said inverter; and
  wherein said first counter stops in response to one of said transition points in said modified first switch operation signal.

6. A circuit for controlling the operation of solid state switching devices in an output stage of an electronic inverter, as recited in claim 5, further comprising:
  means for producing a second switching command signal;
  a second counter for counting said pulses, said second counter beginning to count said pulses in response to a transition point in said second switching command signal;
  means for producing a second switch drive signal having transition points occurring when said second counter reaches said predetermined count;
  a second solid state switching device, said second solid state switching device changing conduction state in response to the transition points in said second switch drive signal;
  means for producing a second switch operation signal having transition points occurring in response to a change in the conduction state of said second solid state switching device;
  means for producing a modified second switch operation signal by time shifting the transition points of said second switch operation signal by an amount corresponding to said level of DC voltage produced by said inverter; and
  wherein said second counter stops in response to one of said transition points in said modified second switch operation signal.

* * * * *